United States Patent [19]
Gillis, Jr.

[11] 4,084,251
[45] Apr. 11, 1978

[54] FOURIER TRANSFORM GENERATOR FOR BI-LEVEL SAMPLES

[75] Inventor: Alva Knox Gillis, Jr., Melbourne, Fla.

[73] Assignee: Harris Corporation, Cleveland, Ohio

[21] Appl. No.: 665,709

[22] Filed: Mar. 10, 1976

[51] Int. Cl.² ............................................. G06F 15/34
[52] U.S. Cl. .................................................... 364/726
[58] Field of Search ............... 235/152, 156, 159, 160, 235/164

[56] References Cited

U.S. PATENT DOCUMENTS

| | | | |
|---|---|---|---|
| 3,515,990 | 6/1970 | Robertson | 324/77 G |
| 3,638,004 | 1/1972 | Sloane et al. | 235/156 |
| 3,778,604 | 11/1973 | Bosc et al. | 235/152 |
| 3,920,974 | 11/1975 | Means | 235/152 |

OTHER PUBLICATIONS

N. Ahmed et al., "Discrete Cosine Transform", IEEE Trans. on Computers, Jan. 1974, pp. 90–93.

*Primary Examiner*—David H. Malzahn

[57] ABSTRACT

Apparatus is provided for computing the Fourier coefficients of a finite block of bi-level bits. This is accomplished by formating the finite block of bits into an even function which is symmetrical about an origin such that both the data bits and a mirror image thereof are contained in a data block of N bits. This permits computation of a Fourier transform which will result in only cosine terms by the relatively simple Fourier transform generator structures disclosed herein. In one embodiment, a plurality of coefficients are generated simultaneously.

23 Claims, 12 Drawing Figures

FIG. 6

| $gn$ | $g(\frac{N}{2}-n)$ | x2 | x1 |
|---|---|---|---|
| 0 | 0 | 0 | 0 |
| 0 | 0 | 0 | 0 |
| 1 | 0 | 0 | 0 |
| 1 | 1 | 1 | 0 |
|  |  |  |  |

FIG. 7

| $gn$ | $g(\frac{N}{2}-n)$ | -1 | +1 |
|---|---|---|---|
| 0 | 0 | 0 | 0 |
| 1 | 0 | 0 | 1 |
| 0 | 1 | 1 | 0 |
| 1 | 1 | 0 | 0 |
|  |  |  |  |

FIG. 8

| $g\frac{n}{4}$ | $kb$ | -1 | +1 |
|---|---|---|---|
| 0 | 0 | 0 | 0 |
| 1 | 0 | 0 | 0 |
| 1 | 0 | 1 | 0 |
| 0 | 1 | 0 | 0 |
|  |  |  |  |

FOURIER TRANSFORM GENERATOR FOR BI-LEVEL SAMPLES

This invention relates to the art of Fourier transform generators and more particularly to a generator for computing the Fourier coefficients of a finite block of binary bits.

Generally, Fourier transform generators known in the art serve to calculate the Fourier coefficients of analog complex functions rather than bi-level real functions. Most general purpose computers cannot perform the transform operation in real time. A number of general purpose fast Fourier transform hardware processors are available and, in some cases, have the capability to calculate in real time the Fourier transform of a digital data block. Whereas known fast Fourier transform processors are available which can process real functions, it is not known of any which utilize the symmetries of bi-level, even functions to abbreviate the transform process for these functions.

It is therefore a principal object of the present invention to provide a Fourier transform generator for calculating the Fourier coefficients of a real, rather than complex, bi-level function which is even, i.e., symmetrical about an origin.

It is a still further object of the present invention to provide apparatus for computing the Fourier coefficients of a finite block of binary bits which employs substantially less hardware than that employed in a conventional Fourier transform generator used for processing analog complex functions.

It is yet another object of the present invention to provide a Fourier transform generator for simultaneously calculating a plurality of Fourier coefficients of a finite block of binary data bits.

In accordance with the present invention, apparatus is provided for computing the Fourier coefficients of a finite block of binary data bits which is symmetrical about an origin. The circuit responds to any finite input block of binary data bits to provide the Fourier coefficients of the finite even block of data bits the first half of which corresponds to the input block of data. This results in a Fourier transform comprised of only cosine terms. Consequently, Fourier coefficients are only computed in accordance with the Fourier cosine transform.

DESCRIPTION OF THE DRAWINGS

The following and other objects and advantages of the invention will become more readily apparent from the following description of the preferred embodiments of the invention as taken in conjunction with the accompanying drawings which are apart hereof and wherein:

FIG. 5a-5f are detailed schematic block diagram illustrations of a preferred embodiment of the Fourier transform generator according to the present invention; and, FIGS. 6, 7 and 8 are truth tables employed in describing the embodiment of FIG. 5.

DESCRIPTION OF THE PREFERRED EMBODIMENT

Reference is now made to the drawings wherein the showings are for the purposes of illustrating preferred embodiments of the invention only and not for purposes of limiting same.

Figure 1:
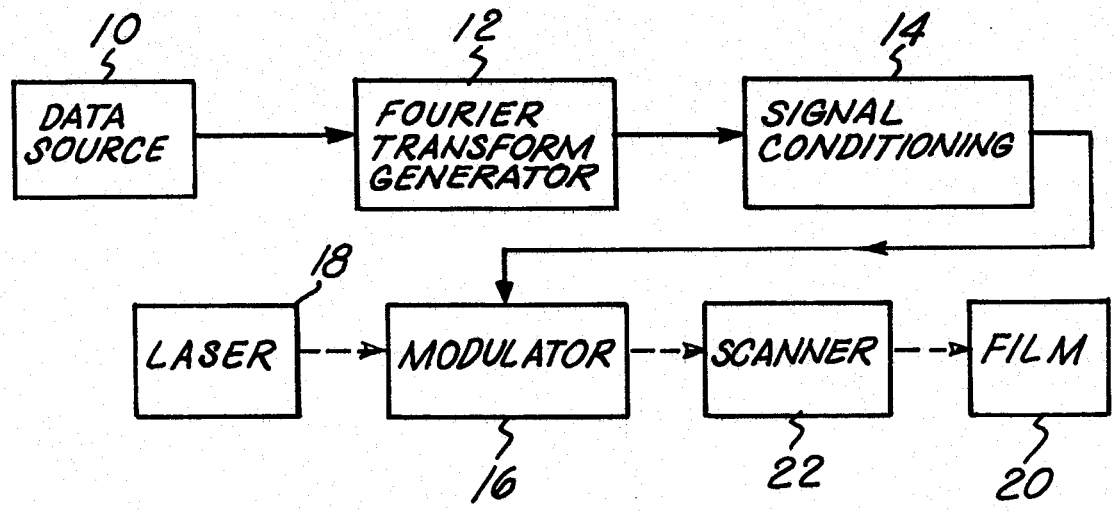
FIG. 1 is a block diagram illustration of one application of the present invention as applied to a synthetic hologram recording system.

Reference is now made to FIG. 1 which illustrates one application of the present invention as applied to a synthetic hologram recording system wherein a byte of binary data is supplied by a suitable data source 10 to a Fourier transform generator 12, constucted in accordance with the present invention, and which provides a transform of the byte of digital data. The transform is applied to suitable signal conditioning circuitry 14 which in turn supplies a time varying modulating signal, representative of the Fourier series transform, to a modulator 16. The modulator 16 responds to the modulating signal to intensity modulate a beam of coherent light obtained from a laser source 18 as the beam is scanned across a photosensitive film 20 by means of a suitable acousto-optic or mechanical scanner 22.

In accordance with the present invention, improved apparatus and method are provided for computing the Fourier coefficients of a finite block of bi-level binary bits. Three different embodiments are disclosed herein with the embodiment of FIG. 3 being directed to what may be considered as an analog system, the embodiment of FIG. 4 being a simplified digital version and the embodiment of FIG. 5 being a detailed digital version of the presently preferred embodiment of the invention. In each embodiment, the block of data bits if formated into an even function which is symmetrical about an origin in such a manner that data bits and a mirror image thereof are contained in an enlarged data block of N bits. This block of N bits is then processed so as to obtain the Fourier coefficient in accordance with a Fourier cosine transform.

Before proceeding with a detailed description of the various embodiments of the Fourier transform generaor, attention is first directed to some of the theoretical considerations involved. A discrete Fourier transform consists of samples of the normal or cntinuous Fourier transform wherein the mathematical relationship describing these samples is as follows:

$$a_k = \sum_{n=0}^{N-1} g_n e^{\frac{-i 2\pi k n}{N}}, \quad k=0, 1, 2, \ldots (N-1), \quad (1)$$

where:
- $n$ = index of data bit
- $a_k$ = samples of the Fourier transform of the function $g_n$
- $g_n$ = "1" of the $n^{th}$ input data bit is present
- $g_n$ = "0" if the $n^{th}$ input data bit is absent
- $N$ = total number of format data bits
- $k$ = output sample index
- $i$ = imaginary operator
- $e$ = base of the natural system of logarithms and equal 2.71828

The samples represented by the sequence of equation (1) are complex, having both amplitude and phase. In an interferrometrically generated hologram, the phase information is encoded in the pattern as a result of the interference between a reference beam and an information-bearing (signal) beam. If the binary data encoded within the hologram is formated in a special manner, to be described hereinafter, then equation (1) may be reduced to the Fourier cosine transform:

$$a_k = \sum_{n=0}^{N-1} g_n \cos \frac{(2\pi nk)}{N} \quad k=0, 1, 2, \ldots (N-1). \quad (2)$$

where all terms are as defined above.

The samples in the sequence of equation (2) are real, having no imaginary values (no phase information) associated with them. Consequently, these samples may be readily calculated by electronic means and recorded directly on film by a scanning device, such as laser recorder.

Figure 2:
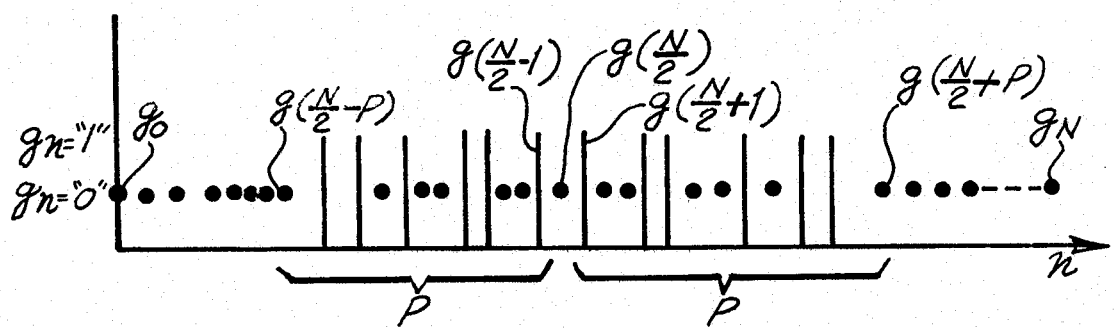
FIG. 2 is a graphical illustration showing the manner in which a byte of binary data has been reformated so as to include the byte as well as its mirror image.

To achieve this real amplitude function the binary data information in accordance with the present invention is formated into an even function; that is, a function have symmetry about an origin such that $f(t) = f(-t)$. This type of function is illustrated in FIG. 2. In this illustration it is assumed that a data source such as data source 10, in FIG. 1, has provided a byte of data bits having a finite number of bit positions P. For purposes of simplification in FIG. 2, only 12 bit positions have been illustrated and the binary pattern is 011010011001. In order to achieve the real amplitude function required by equation 2, this byte of binary data is formated into an even function, which includes the original byte of data having P bit positions and its mirror image which are positioned in a block of data have N bit positions. As shown in FIG. 2 the origin may be considered as being located at bit position N/2. This bit position is a unique point of symmetry whose mirror image is itself, and, although shown to have a binary level of "0", it is not restricted to this value. It should also be noted that bit position zero is a similar point of symmetry. Consequently then, the block of N bit positions includes a bit position for the origin and 2P bit positions for the original byte of data and its mirror image. Since it is intended that this data be processed to obtain a Fourier transform hologram and recorded on film, several bit positions from bit position 0 to a bit position (N/2) - P contains zeros.

These zeros are inserted at the beginning as well as at the end (for the mirror image) because these regions may be contaminated upon readout due to scattering from the DC or average value of the hologram recording and, hence, may be undesirable positions to use for variable data. This is not intended to be a constraint of the present invention, however. If desired, any or all of the bit position from $g_o$ to $g_{N/2}$ can be assigned data values.

An examination of the bit formating of FIG. 2 shows that the binary data information has been formated into an even function which is symmetric about an origin at bit position (N/2). Also, only a finite number of bit positions are being considered. Consequently then, the original data byte and its mirror image may be assumed to comprise one cycle from a periodic waveform of infinite extent. Application of a Fourier transform to such an even periodic waveform will result in only cosine terms and, hence, a real function having no phase information is obtained from the transformation process. The electronic circuitry need only calculate one period of this signal and store the information in a suitable memory which may be cycled as many times as is required in a recording process to record one or more periods of the synthetic hologram.

FIRST EMBODIMENT OF THE INVENTION

Figure 3:
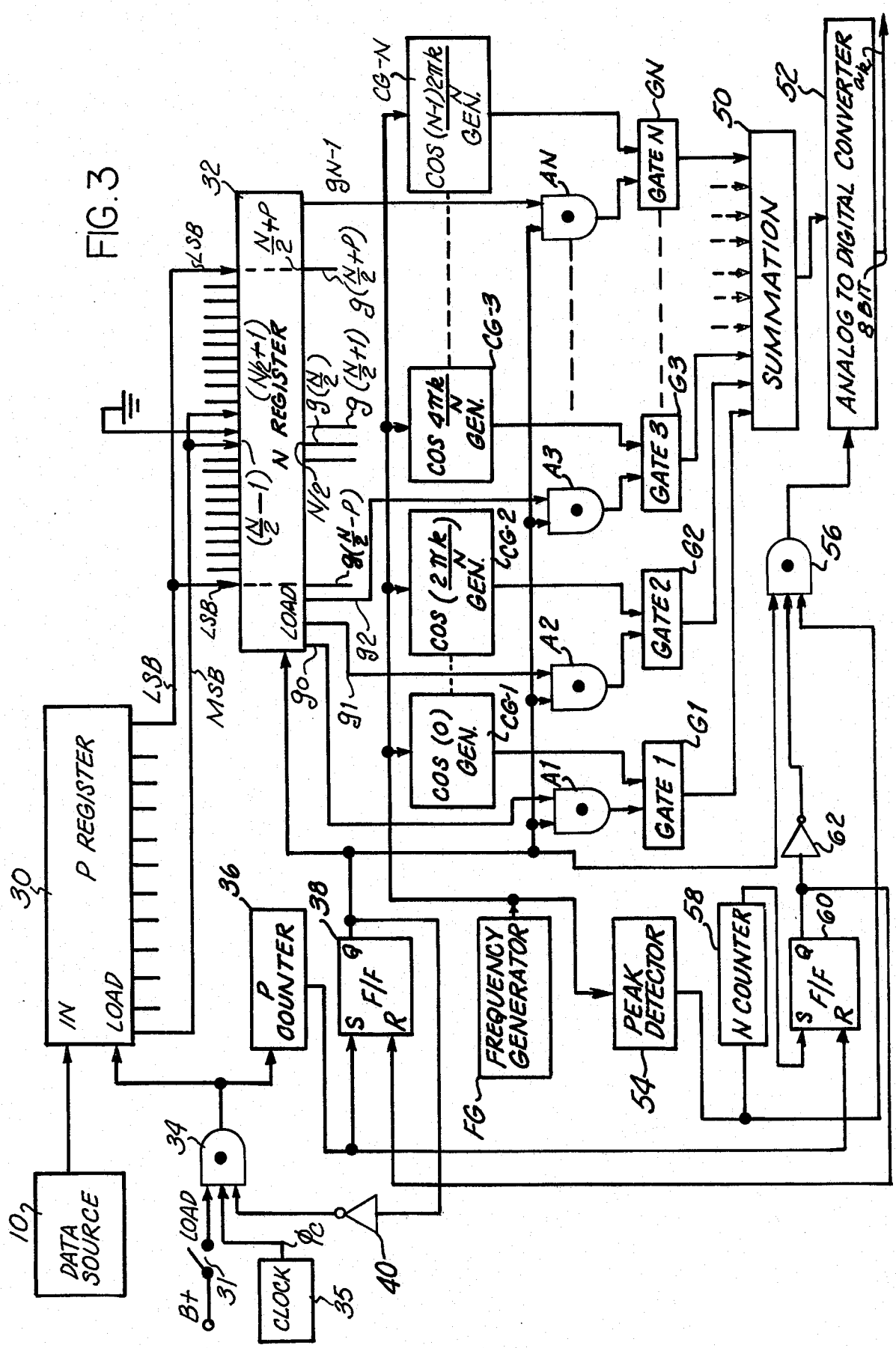
FIG. 3 is a block diagram illustration of one embodiment of the present invention employing an analog form of Fourier transform generator.

Reference is now made to the embodiment of the invention illustrated in FIG. 3. The formating of a byte of binary data having a finite number of bit positions P is provided by circuitry which includes a P register 30 and an N register 32. Data source 10 provides a byte of binary bits having P bit positions. This may be a serial stream of data and since it may contain both binary "0" as well as binary "1" signals, the data stream is clocked into a series load-parallel output type register 30. A loading cycle commences upon closure of a load switch 31 which enables an AND gate 34 which then passes clock pulse $\phi_c$ from a clock source 35 to the load input of register 30. A conventional counter 36 keeps track of the loading process by counting up one count for each clock pulse $\phi_c$ until a total of P clock pulses have been counted. This signifies that the total byte of data is now loaded in register 30. The P counter 36 has obtained a count of P and sets a flip flop 38 whose Q output now carries a binary "1" level signal which is inverted by an inverter 40 to disable gate 34 and thereby prevent further loading of register 30. The binary "1" level signal obtained from the Q output of flip flop 38 is also employed as a load signal and is applied to the load input of the N register 32.

The N register 32 may take the form of a parallel inparallel out multibit position register having at least N bit storage locations. When a load signal is applied to the load input of register 32 from flip flop 38, the byte of data located in register 30 is loaded into the N register in a special format. Thus the byte of P data bits is loaded into the N register as well as the mirror image of that byte of data together with various zeros (refer to FIG. 2). This formating may be done by connecting the least significant bit lines LSB of register 30 as an input to bit position $$(\frac{N}{2} - P)$$

as well as to bit position $$(\frac{N}{2} + P).$$

The origin bit position (N/2) does not receive data and, hence, effectively stores a binary "0" signal. The most significant bit MSB of register 30 is connected to bit position $$(\frac{N}{2} + 1)$$

of register 32. The bit positions intermediate the most significant bit position MSB and the least significant bit position LSB are interconnected between the P register and the N register in the same manner as discussed above so that both the original byte of data and its mirror image are stored in the N register in a symmetrical fashion about the origin bit position (N/2). The bit positions between the beginning of the register and bit position (N/2) - P are filled with binary "0" signals and similarly the bit positions after bit position (N/2) + P through the last bit position of the register 32 are filled with binary "0" signals.

When flip flop 38 is set it applies a load signal to register 32 as discussed above and also applies a binary "1" signal for enabling each of a plurality of AND gates A1 through AN. These gates each have a second input taken respectively from an associated one of the N bit positions of the N register 32. If the associated bit position in register 32 stores a binary "1" signal then the AND gate will pass a binary "1" signal to in turn enable one of a plurality of analog AND gates G1 through GN. If the associated bit position of the N register stores a binary "0" signal, then the AND gate will not enable its associated analog gate G1 through GN. Consequently then the analog gates G1 through N are enabled in accordance with the pattern of binary signals stored in the N register 32. If the associated bit is present in the data being stored then the gate is enabled. Otherwise the gate is disabled.

Each of the analog gates G1 through GN has a second input taken from an associated cosine generaor CG-1 through CG-N. These are conventional in the art and each is phase locked to a master oscillator or frequency generator FG and provides as its output signal a frequency unique to each of the N bit positions of the N register. The different frequencies vary in accordance with the progressions shown in the blocks of FIG. 3 such that, for example, generator CG-1 provides an output frequency of cosine (zero), genertor CG-2 provides an output frequency of cosine $$\frac{(2\pi k)}{N}$$

and so on until the last generator CG-N which provides an output frequency of cosine (N - 1)

$$\frac{2\pi k}{N}$$

As used in this embodiment, $k$ is a continuous, linear function of time. This is all in accordance with the equation (2) discussed hereinabove.

From the above it is seen that depending on the bit pattern stored in the N register 32 a particular combination of gates G1 through GN are enabled to pass the frequency signal from associated cosine generator CG-1 through CG-N. These frequency signals are summed together in a frequency summation circuit 50 and applied to an analog to digital converter 52 so that N digital samples of the complex waveform may be provided. If desired, however, the output of the summation circuit 50 may be directly applied to a recording device such as to the modulator 16 of FIG. 1 so that the complex waveform, which represents the Fourier transform of the data in the N register, may be recorded. It is contemplated, however, that in accordance with equation 2 that a total of N samples or coefficients be obtained and this may be conveniently done with the use of a gated analog to digital converter which then will provide a series of N 8 bit binary words representing N sample coefficients of the Fourier transform. Clock pulses are applied to the analog to digital converter to provide the N conversion cycles with the clock pulses being derived from the output of a peak detector circuit 54. This detector circuit provides an output pulse each time it senses a peak in the output from the frequency generator FG. So long as the load signal provided by the flip flop 38 is present, AND gate 56 is enabled to pass the clock pulses from the peak detector circuit 54 to the analog to digital converter. In response to each clock pulse the converter, in a conventional manner, provides an analog to digital conversion of the sample being taken of the complex waveform provided by the summation circuit. Only one period is required and consequently a total of N samples are taken with N corresponding to the total number of bit positions N in the N register 32. Consequently then, a $k$ counter 58 is employed to count the number of clock pulses passed by the peak detector 54 through the enabled AND gate 56. Once this counter has attained a count of N pulses it will set a flip flop 60. When the flip flop 60 is set, its Q output carries a binary "1" signal. This is inverted by inverter 62 to disable the AND gate 56 to prevent further conversion by the analog to digital converter 52. In addition, the binary "1" signal obtained from flip flop 60 is also applied as a reset signal to the reset input of flip flop 38. This removes the load signal which was previously applied to the N register 32, the AND gates A1 through AN, and the AND gate 56. The circuitry is now conditioned to process another byte provided by the data source 10.

SECOND EMBODIMENT

Figure 4:
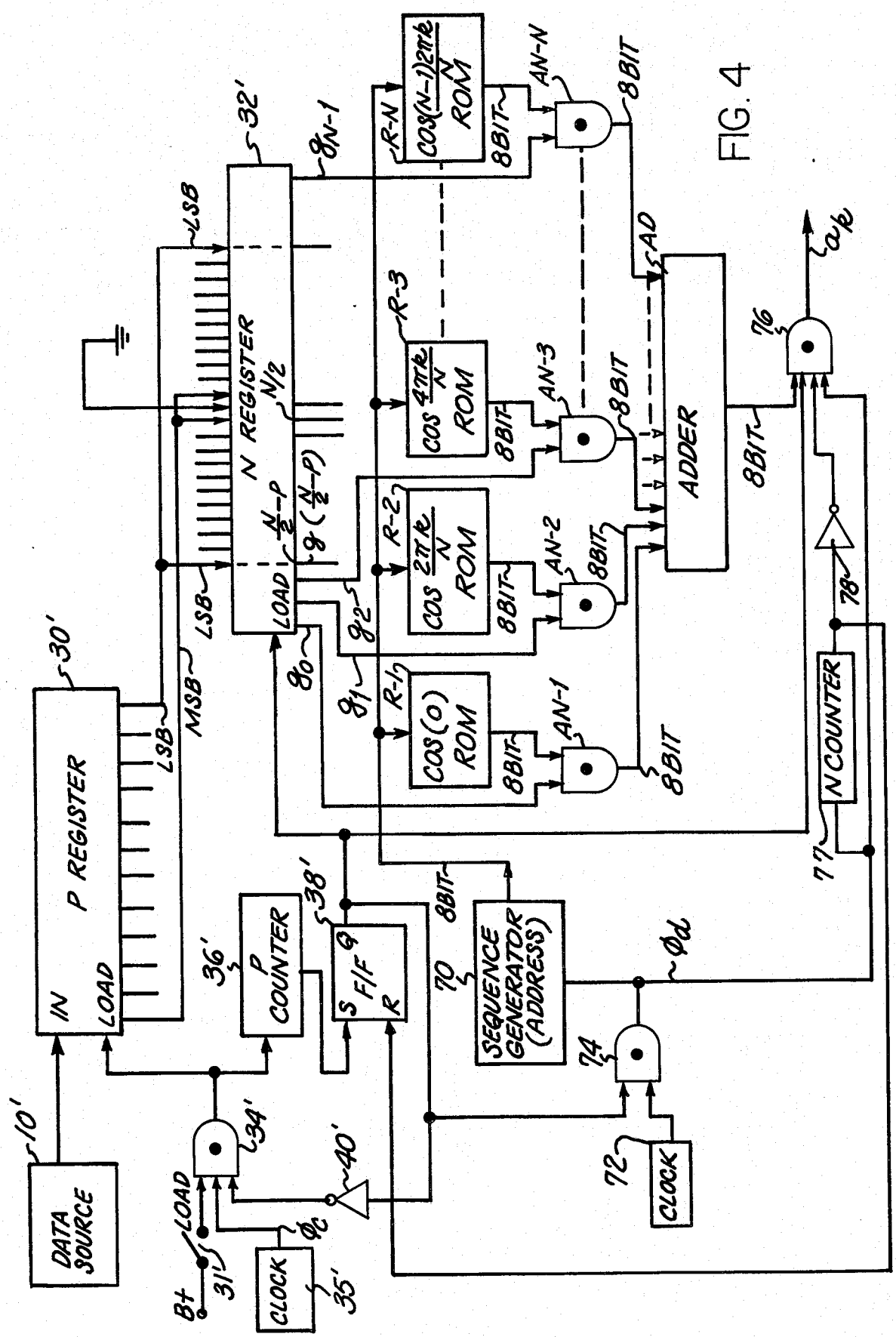
FIG. 4 is a block diagram illustration of a digital Fourier transform generator in accordance with the present invention.

Reference is now made to FIG. 4 which illustrates what may be termed as a digital embodiment of the invention and which is structured quite similar to that of the embodiment of FIG. 3. Consequently then, for purposes of simplifying the description herein like components in FIGS. 3 and 4 are identified with like character reference with those in FIG. 4 being identified with a primed character i.e. data source 10' or register 30' and the like. Only the differences in the embodiments of FIGS. 3 and 4 will be described herein in detail.

As can be seen from a comparison of the embodiments of FIGS. 3 and 4 the formating of a byte of data is accomplished with the P register 30' and the N register 32' and accompanying circuitry in FIG. 4 in the same manner as discussed hereinbefore with respect to the P register 30 and the N register 32 of FIG. 3. In the embodiment of FIG. 3 cosine generators CG-1 through CG-N were employed. In the embodiment of FIG. 4 the cosine generators are replaced with read only memories (ROM) R-1 through R-N. Each is a conventional read only memory and, for example, stores a plurality of eight bit binary words at sequentially addressable locations so that when addressed each ROM provides an eight bit word having a value in accordance with a given phase of the frequency associated with that ROM. For example, ROM R-3 provides frequency samples in accordance with the formula COS $$\frac{(4\pi k)}{N}$$

for values of $k = 0, 1, 2, \ldots (N - 1)$, where $k$ also represents the address of the various memory locations. Since a total of N samples are obtained each ROM has a total of N addressable locations which are addressed in the order of $k = 0, 1, 2, \ldots (N - 1)$. The addressing for ROMS R-1 through R-N is obtained from a sequence generator 70 which in response to each clock pulse $\phi_d$ from a clock source 72 provides an eight bit address word. These words are sequentially updated with each clock pulse as each ROM is sequentially addressed from word to word for values of $k = 0, 1, 2, \ldots (N - 1)$. The addressing continues so long as flip flop 38 is set so as to enable AND gate 74 located between the sequence generator and ROMS R-1 through R-N. The sequence generator may in itself, take the form of a read only memory (ROM) to provide the sequential address words for a total of N addresses whereupon the sequence repeats itself on the next load cycle.

Each ROM provides a unique binary word representing a sample of a particular frequency. That frequency is associated with one of the bit locations in the N register 32'. If the associated bit position stores a binary "1" signal then the frequency signal is passed by an associated one of AND gates AN-1 through AN-N to a binary adder AD. Consequently then, depending upon the bit sequence in the N register certain of the frequency sample words of ROMS R-1 through R-N will be passed and then summed by the adder AD. The output of adder AD is an eight bit binary word representative of a particular sample of the Fourier transform of the binary data being processed. Since a total of N samples are to be obtained these eight bit sample words are gated out through an AND gate 76 in synchronizism with the clock pulses $\phi_d$. A N counter 78 keeps track of the number of coefficients being supplied by counting the clock pulses $\phi_d$. Once the counter has obtained a count of N it disables AND gate 76 through an inverter 78 and also resets flip flop 38 removing the load signal applied to register 32' and AND gates 74 and 76. Consequently then, a maximum of N coefficients or samples are passed by the AND gate 76 to suitable utilization circuit means such as the signal conditioning circuitry 14 of FIG. 1 so as to apply a time varying modulating signal to a modulator to intensity modulate a laser beam for holographic recording.

PREFERRED EMBODIMENT

In the embodiments of FIGS. 3 and 4 a direct implementation is provided for the equation 2. However, both embodiments have included N cosine generators or N memories filed with samples of the generators, N gates, and N summing channels for each $a_k$ calculated. Further improvements may be made by some of the following observations. Thus, the argument of the cosine function $$\frac{(2\pi nk)}{N}$$

causes the cosine function to take on only specific values. Due to the periodic nature of the cosine function, there are only N/2 different values; and due to the quadrant symmetry of the cosine function, there are only N/4 different magnitudes, irrespective of sign, assumed by the function. Since speed of operation is of prime consideration in the use of a Fourier transform generator for recording holograms and the like, all symmetry properties of equation 2 should be utilized to avoid redundant calculation operations. Before describing the preferred embodiment of the invention with reference to FIG. 5, attention is first directed to some basic properties employed in equation 2 which may be incorporated to increase the speed of operation in a commercial embodiment of the invention.

Because the input data block has been formated from data bits such that an even function is attained, $$g_{N-n} = g_n.$$

Noting also that $$\cos\left[\frac{2\pi}{N} k(N-n)\right] = \cos\left[\frac{2\pi nk}{N}\right],$$

then Eq. (2) can be reduced to $$a_k = 2\left\{\sum_{n=1}^{N/2-1} g_n \cos\left[\frac{2\pi}{N} nk\right]\right\} + (g_{\frac{N}{2}})(-1)^k + g_o \quad (3)$$

Two unique points of symmetry exist at $g_o$ and $g_{N/2}$. For the embodiment described herein, these unique points are assumed to be zero. For those applications where this is not desireable, appropriate circuitry can be easily designed to utilize these bits to set an initial value in the electronic summing registers used to calculate values for $a_k$. This fact will become more readily apparent as the disclosure is more fully made.

The remaining development, therefore, assumes $g_{N/2}$ and $g_o$ are set to zero. The constant amplitude scale factor 2 is also ignored. Therefore, under these additional conditions, $$a_k = \sum_{n=1}^{N/2-1} g_n \cos\frac{2\pi nk}{N}. \quad (4)$$

It is now observed that $$\cos\frac{(\pi k - 2\pi nk)}{N} = \begin{cases} -\cos\frac{2\pi nk}{N} \text{ for } k \text{ odd} \\ +\cos\frac{2\pi nk}{N} \text{ for } k \text{ even} \end{cases}$$

hence, Eq. (4) reduces to:

$$a_k = \begin{cases} \sum_{n=0}^{N/4-2}(g_n + g_{\frac{N}{2}-n})\cos\frac{[2\pi nk]}{N} + g_{\frac{N}{4}}(-1)^{k/2} \text{ for } k \text{ even} \\ \sum_{n=1}^{N/4-1}(g_n - g_{\frac{N}{2}-n})\cos\frac{[2\pi nk]}{N} \text{ for } K \text{ odd.} \end{cases} \quad (5)$$

Equation (5) shows that if a slightly different processor is used to calculate the even $a_k$'s than is used to calculate the odd $a_k$'s, additional savings in calculation speed can be obtained. For example, it is only necessary to cycle through the memory containing cosine term magnitudes one time rather than four; the $a_k$'s generated for an odd index are independent of bit $g_{N/4}$; and the input data is processed two bits at a time.

Thus far the development has considered symmetry of the cosine function with respect to the data bit index n. There is also symmetry with respect to the sample index k. Through a process similar to the above it can be shown that $a_k$ is identically equal to $a_{N-k}$ and, further, that $$a_k = \sum_{n=\text{even}} g_n \cos\left[\frac{2\pi}{N} nk\right] + \sum_{n=\text{odd}} g_n \cos\left[\frac{2\pi}{N} nk\right] \quad (6)$$

-continued $$a_{\frac{N}{2}-k} = \sum_{n=\text{even}} g_n \cos\frac{[2\pi}{N} nk] - \sum_{n=\text{odd}} g_n \cos\frac{[2\pi}{N} nk].$$

Hence the summing operation is performed such that the sum of the even indexed $g_n$'s and odd indexed $g_n$'s are individually identifiable, then $a_k$ for $0 \leq k \leq N/4$ is found by adding the two individual sums; and $a_k$ for $N/4 \leq k \leq N/2$ is found by subtracting the individual sums.

The sample value $a_{N/4}$ is also a unique point of symmetry and can be calculated in several ways, i.e., directly from equation 6 or by noting that:

$$a_{N/4} = \sum_{\substack{n=0 \\ n=\text{even}}}^{N/4-2} (g_n + g_{\frac{N}{2}-n})(-1)^{n/2} + g_{N/4}(-1)^{N/8} \quad (7)$$

Figure 5A:
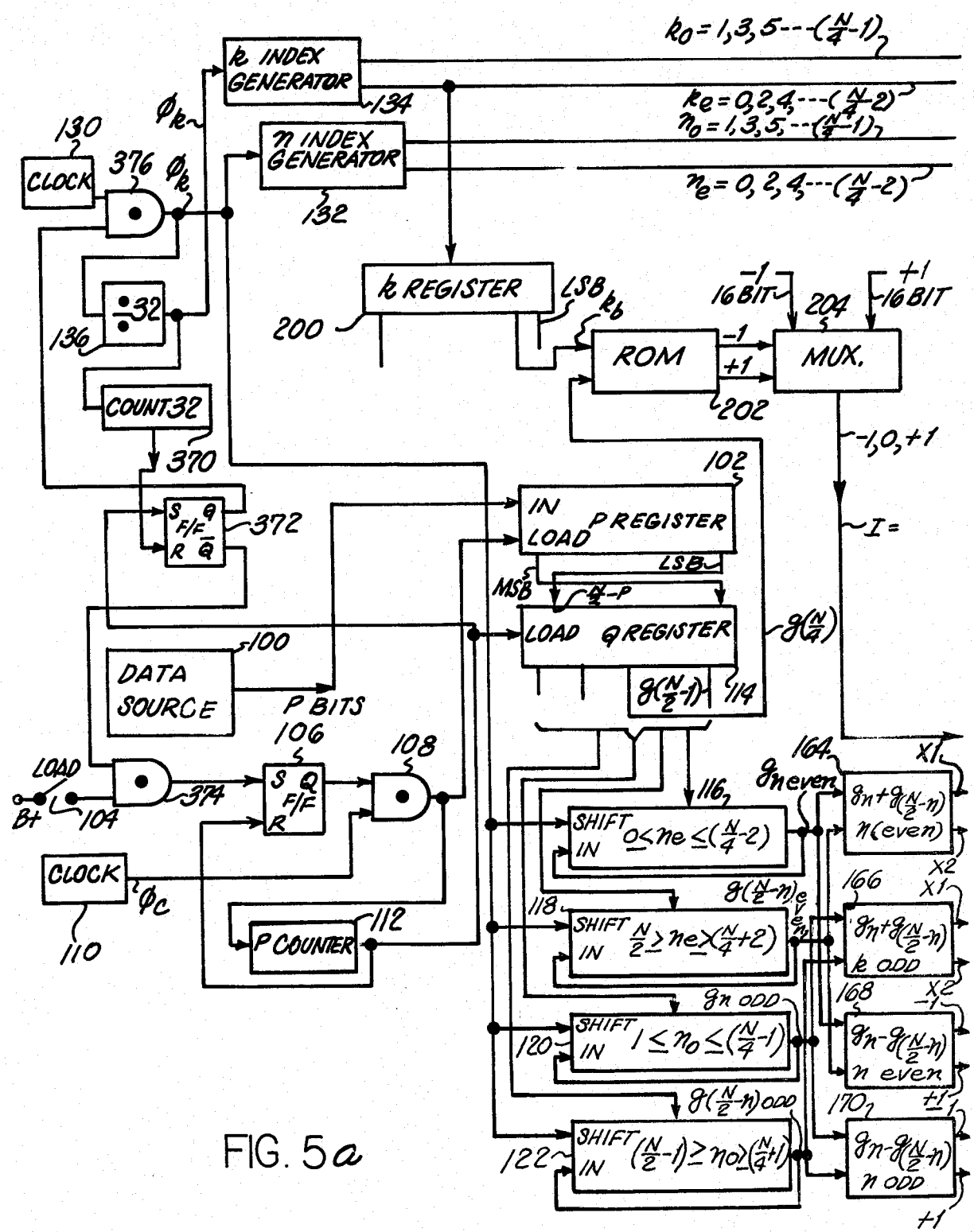
Figure 5B:
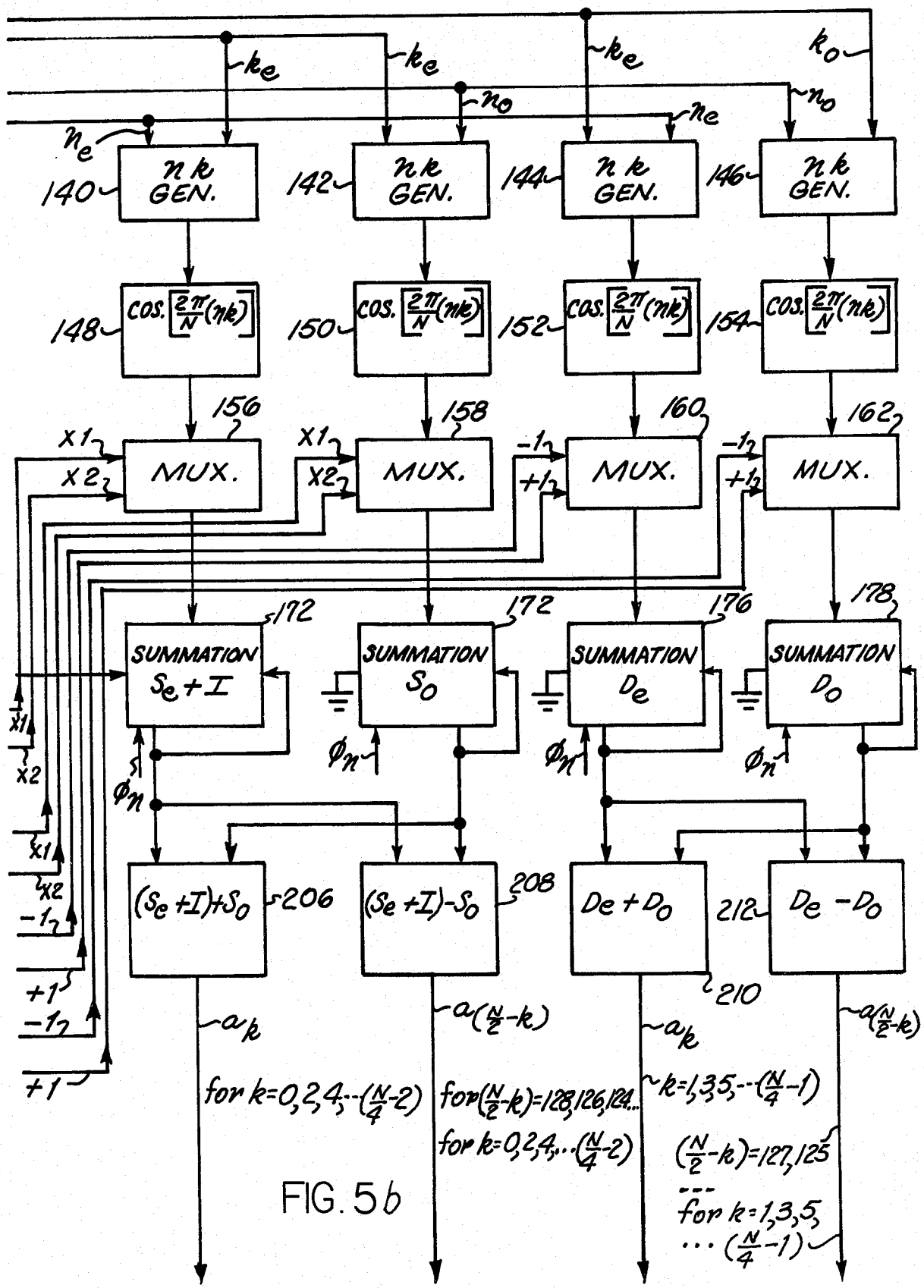
Figure 5C:
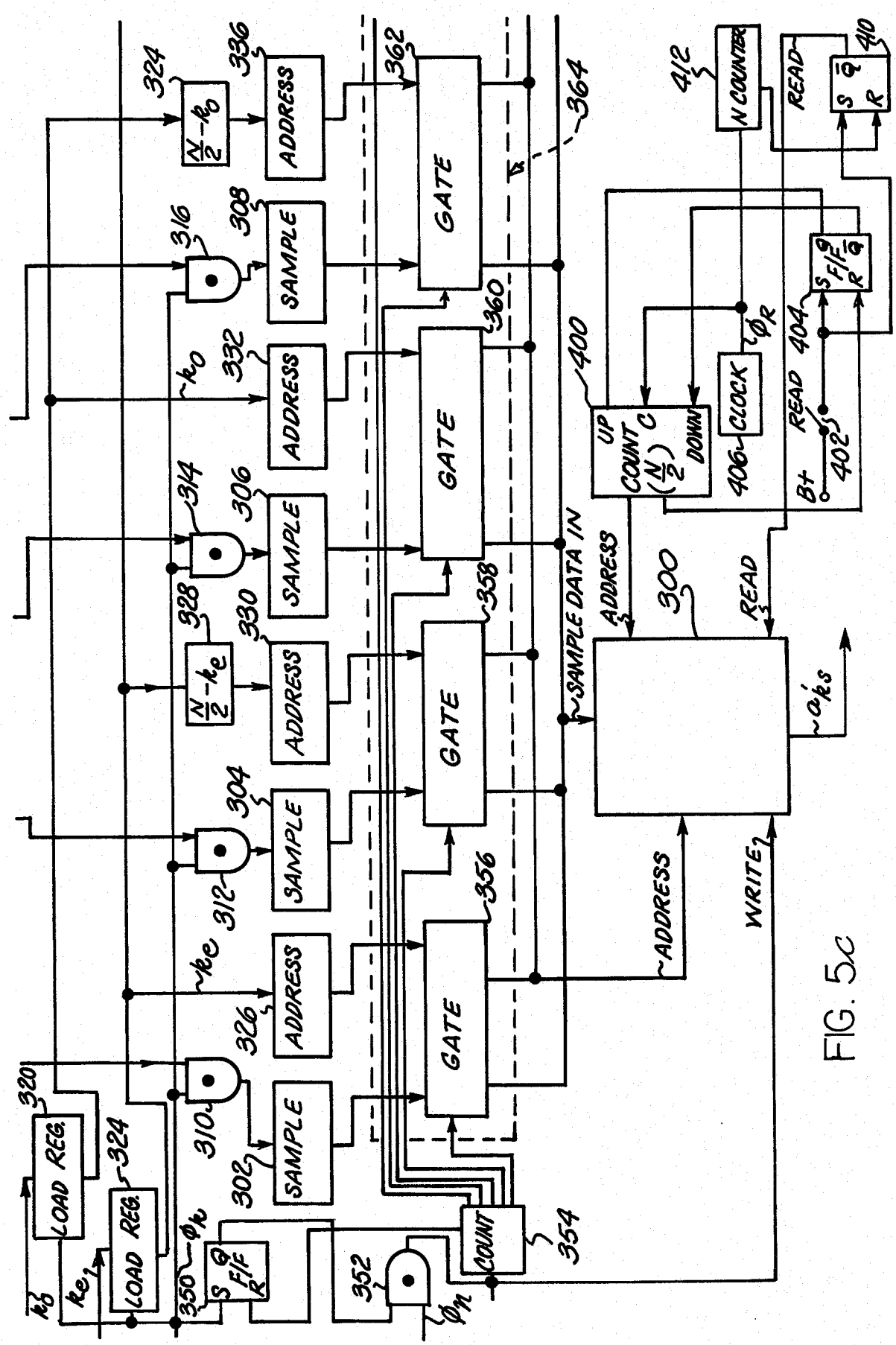
Figure 5D:
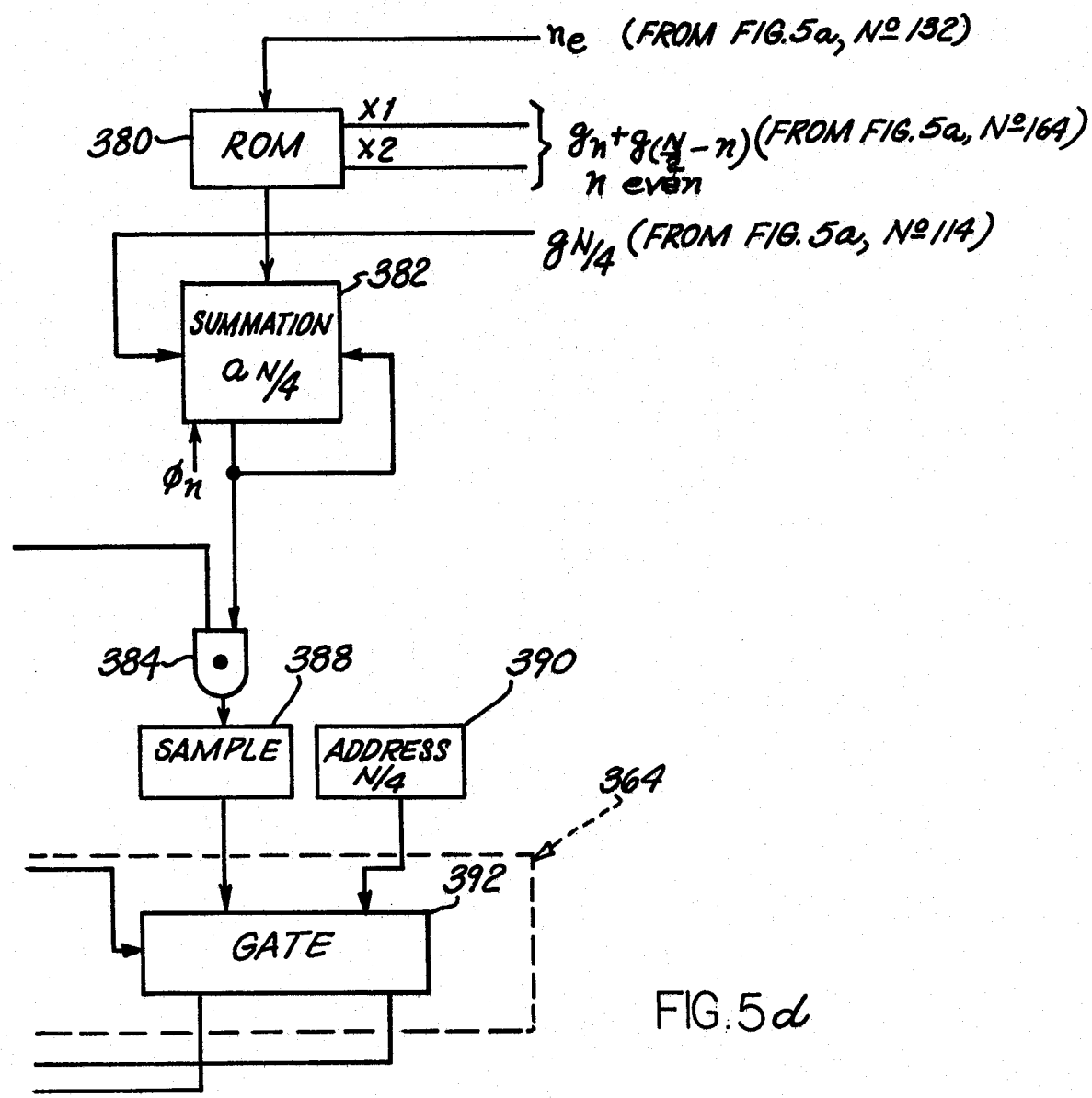
Figure 5E:
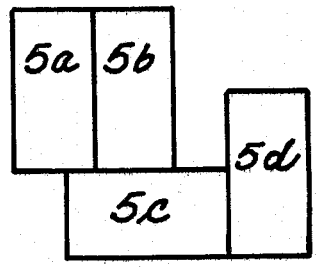

Sample $a_{N/4}$ is, therefore, easily calculated by specialized logic circuitry which merely adds or substracts even data bits from an accumulator which is initialized with the value of $g_{N/4}(-1)^{N/8}$. This circuitry is shown in FIG. 5d, and will be described in greater detail hereinafter.

It should be noted that at this point that the Fourier transform algorithm described by equations 5 and 6 is applicable to any N which is an integer multiple of 8. This contrasts with the Fast Fourier Transform (FFT) algorithm which is typically constrained to N's which are integer powers of 2.

$$\left.\begin{array}{l} a_k = g_{\frac{N}{4}}(-1)^{k/2} + S_o + S_e \\ \rule{6em}{0.4pt} \\ a_{\frac{N}{2}-k} = g_{\frac{N}{4}}(-1)^{k/2} + S_e - S_o \end{array}\right\} \text{for } k=0, 2, 4, \ldots(N/4-2) \quad (8)$$

$$\left.\begin{array}{l} a_k = D_e + D_o \\ \rule{6em}{0.4pt} \\ a_{\frac{N}{2}-k} = D_e - D_0 \end{array}\right\} \text{for } k=1, 3, 5, \ldots(N/4-1)$$

$$a_{\frac{N}{4}} = \sum_{\substack{n=0 \\ n=\text{even}}}^{N/4-2} (g_n + g_{\frac{N}{2}-n})(-1)^{n/2} + g_{\frac{N}{4}}(-1)^{N/8}$$

where $$\left.\begin{array}{l} S_e = \sum_{\substack{n=0 \\ n=\text{even}}}^{N/4-2} (g_n + g_{\frac{N}{2}-n}) \cos\frac{[2\pi nk]}{N} \\ \rule{8em}{0.4pt} \\ S_o = \sum_{\substack{n=1 \\ n=\text{odd}}}^{N/4-1} (g_n + g_{\frac{N}{2}-n}) \cos\frac{[2\pi nk]}{N} \end{array}\right\} k=0, 2, 4, \ldots N/4 \quad (8b)$$

$$\left.\begin{array}{l} D_e = \sum_{\substack{n=2 \\ n=\text{even}}}^{N/4-2} (g_n - g_{\frac{N}{2}-n}) \cos\frac{[2\pi nk]}{N} \\ \rule{8em}{0.4pt} \\ D_o = \sum_{\substack{n=1 \\ n=\text{odd}}}^{N/4-1} (g_n - g_{\frac{N}{2}-n}) \cos\frac{[2\pi nk]}{N} \end{array}\right\} k=1, 3, 5, \ldots N/4$$

The processor described by these equations is shown in FIG. 5. Due to the complexity of FIGS. 5a through 5d, FIG. 5e is included to more clearly show the relation between the various parts of the figure. The following should be noted about this embodiment:

The same index may be used for $k_{even}$ and $k_{odd}$ where the least significant bit is hardwired to the respective sign and address generators.

To facilitate pair-wise processing of the even index $g_n$'s and the odd index $g_n$'s, there should be an equal number of running steps in the calculation process for output coefficients having both even and odd output smaple index numbers. This is accomplished by letting the summation operation extend from n values of zero to N/2. This calculation utilizes dummy $g_o$ and $g_{N/2}$ values which are always zero and contribute nothing to the calculation process. As previously pointed out, if the present invention is employed in an application where it is desirable to allow $g_o$ and $g_{N/2}$ to assume data values, this feature is easily added by using these data bits to determine an initialization factor for the accumulators used to calculate the $a_k$'s.

Attention is now directed to the preferred embodiment as more particularly illustrated in FIG. 5 taken together with the truth tables illustrated in FIGS. 6, 7, and 8. This embodiment is an implementation of equations (8a) and (8b) discussed above. As in the embodiment of FIGS. 3 and 4, a byte of data having P bits is supplied by a data source 100 to p register 102. These bits may be supplied in a serial fashion and the P register may take the form of a series input-parallel output multibit register. Upon closure of a suitable load switch 104 a flip-flop 106 is actuated to its set condition so as to enable an AND gate 108. When the AND gate 108 is enabled it passes clock pulses $\phi_c$ from a clock source 110 to the load input of register 102. Thus, with each clock pulse supplied to the input of the P register, a bit from the data source is clocked into the register. A data train of P bits is being considered and, hence, a P counter 112 keeps track of the number of clock pulses provided by the clock source 110 to indicate when the P register is filled. Once this occurs, the P counter resets flip-flop 106 to prevent further bits from being clocked into the P register.

Should the data source be capable of providing P bits in parallel, the data block may be loaded directly into the Q register by means of appropriate gating logic.

A byte of data having a total of P data bit positions is now loaded in the P register 102. In this embodiment of the invention there is a somewhat different formating of this data that descrived previously with respect to the embodiments of FIGS. 3 and 4. As brought out in the discussion immediately above, data representing only bit positions through $(\frac{N}{2}-p)$ $(\frac{N}{2}-1)$ is to be processed. Consequently then, the byte of P data bits is loaded in parallel fashion from the P register 102 to Q register 114 with the least significant bit from the P register being placed in bit position $$(\frac{N}{2}-p)$$

in the Q register and the most significant bit in the P register being loaded into bit position $$(\frac{N}{2}-1)$$

of the Q register 114. The bit positions from 0 to that just prior to bit position (N/2) - P and bit position N/2 in the Q register are filled with binary "0's", as by tying each of these bit positions to ground. If in the equation being employed N = 256 then this represents 96 bits of data together with 32 zeros together with a mirror image thereof plus a zero at $n$ = 128. In this embodiment of the invention, unlike those shown in FIGS. 3 and 4, the formating does not require that all 256 bit positions be loaded in a register. Instead, only bit positions for bit indices $n$=0 through $n$=N/2 are loaded. This is in accordance with the equation discussed hereinabove.

In the formating various combination of the bit positions of the Q register are connected to one of four registers 116, 118, 120, and 122 in accordance with the nomenclature shown in the drawing of FIG. 5. Thus with reference to register 116 only the bits in the Q register in the even bit positions ($n_e$) where the bit index $n_e$ is equal to or greater than 0 but less than or equal to $$(\frac{N}{4}-2)$$

are loaded into register 116. Similarly only the even index bits having index bit positions which are equal to or less than N/2 but greater than or equal to $$(\frac{N}{4}+2)$$

are loaded into register 118. Those bits that are located at bit positions having an odd bit index ($n_o$) and having values greater than or equal to 1 but less than or equal to $$(\frac{N}{4}-1)$$

are loaded into register 120. Also those bits in the Q register having an odd bit index ($n_o$) less than or equal to $(\frac{N}{2}-1)$ but greater than or equal to $$(\frac{N}{4}+1)$$

are loaded into register 122.

Registers 116 through 122 preferably take the form of recirculating shift registers which are each loaded in parallel and with the bits shifted in synchronism with clock pulses applied to the shift input and the output bits being reapplied by a recirculating path to the input of the shift register. The bits are formated in each of the registers so that on sequential clock pulses applied to the shift input one bit at a time is outputted with that bit having a particular value in accordance with the bit position of that bit in the original byte of data loaded into the P register 102. Thus for example the output of register 116 sequentially provides a bit having a value $g_n$ (even). Thus depending on the bit index (number of bit index clock pulses applied to the shift register) the output of register 116 will have a binary level of "1" or "0" and these bits will appear on the output of the register in the order of bit index $n_e$ = 0, 2, 4, . . .

$$(\frac{N}{4}-2).$$

Thereafter, the cycle will repeat itself. Similarly, each output bit obtained from register 118 will have a value $$g(\frac{N}{2}-n) \text{ even}.$$

These will be outputted in the order, for example, bit position 128, 126, 124 . . .

$$(\frac{N}{4}+2).$$

Similarly, on each iteration of register 120 (in response to each shift pulse applied to the shift input of the register) the output of the register will provide a bit having a value $g_n$ (odd). The binary value will be either "1" or "0" and these bits will be outputted in the order of the odd bit positions from 1, 3, 5 . . .

$$(\frac{N}{4}-1)$$

and then repeat themselves. In a similar manner to that discussed above the bits outputted from register 112 will each have a value of g $$(\frac{N}{2}-n)$$

(odd). These bits will be outputted in the order, for example, of bit indices 127, 125, 123, . . .

$$(\frac{N}{4}+1)$$

The clock pulses for clocking the shift registers 116, 118, 120 and 122 are obtained from a suitable clock source 130. The clock pulses $\phi_n$ from this clock source are also supplied to a bit index generator 132 which for each clock pulse $\phi_n$ provides both odd and even indices in the order of $n_o = 1, 3, 5, \ldots$ $$(\frac{N}{4} - 1)$$

and $n_e = 0, 2, 4, \ldots$ $$(\frac{N}{4} - 2).$$

This means that two bit positions are processed at the same time. In addition, the clock source 130 provides clock pulses to a $k$ index generator 134 which serves to provide two $k$ indices for both odd and even indices ($k_O$ and $k_e$) in the order from $k_o = 1, 3, 5, \ldots$ $$(\frac{N}{4} - 1)$$

and $k_e = 0, 2, 4, 6, \ldots$ $$(\frac{N}{4} + 2).$$

Thus four calculations may be processed simultaneously. In the embodiment being described, only 129 samples are calculated in order to provide the transform of a 256 bit positions for which the Fourier transform is obtained. Since four calculations take place simultaneously then only 32 operations are required. For this reason a divide by 32 circuit responds to the clock pulses $\phi_n$ from source 130 to provide actuating clock pulses $\phi_n$ to the $k$ index generator. Thus each time 32 clock pulses have been counted, the $n$ index generator 132 will provide 32 $n_o$ indices and 32 $n_e$ indices during which the $k$ index generator provides but a single $k_o$ index and a $k_e$ index. The index generators 132 and 134 may each take the form of a sequence generator which for each clock pulse applied to the generator provides two output indices (odd and even) with each index being a multibit binary signal having a value in accordance with the index then in effect.

The $k_e$ output of generator 134 is applied to one input each of $nk$ generators 140 and 142. The $k_o$ output of generator 134 is applied to one input each of $nk$ generators 144 and 146. Similarly, the odd bit index output $n_o$ of generator 132 is applied to one input each of generators 142 and 146 and the even bit index output $n_e$ is applied to one input each of generators 140 and 144. The $nk$ generators 140, 142, 144, and 146 are each binary multiplying circuits which multiply the two indices applied to the circuit to provide a binary output having a value in accordance with the multiplication of the two indices. The output of each generator is a multibit binary pattern and serves as an addressing signal for an associated read only memory 148, 150, 152 and 154. Each read only memory serves, when addressed by its associated $nk$ generator, to provide an output signal in the form of a multibit pattern representative of a particular frequency. This frequency is in accordance with the equation cosine $$[\frac{2\pi}{N}(nk)].$$

Consequently then, each read only memory stores a plurality of these bit patterns in accordance with the total number of combinations of the indices $n$ and $k$ applied to the associated $nk$ generator. A total of 32 different values of the $k$ index is applied to each $nk$ generator and for each $k$ index a total of 32 different bit indices $n$ are applied to the $nk$ generator.

The $nk$ generators calculate the product of $n$ and $k$, modulo N. Consequently, a possible N different addresses may be generated. Since the $nk$ generators are not fed all values of $n$ and $k$, however, the memories need not each contain N different memory locations. More specifically, generators 140, 142, and 144 will only generate even addresses, whereas generator 146 will only generate odd addresses. In each case, the number of memory locations may be reduced by a factor of two. The value of the cosine function $\cos(2\pi nk/N)$ is stored at address ($nk$) in each memory.

The recognition of the symmetry of the cosine function can reduce memory storage requirements even further, but would entail somewhat greater complexity in addressing and memory readout circuits.

A convenient compromise between memory requirements and complexity considerations would be to use the six least significant bits (LSB's) of the 8 bit $nk$ product to address the memory and the remaining two most significant bits (MCB's) to determine the quadrant in which cosine function rests, for that address. The two MSB's could thus be used to determine the sign of the memory output.

Thus far it is seen that in response to each clock pulse a unique bit pattern representative of a particular frequency is provided by each of the read only memories 148, 150, 152, and 154. These bit patterns are respectively applied to associated multiplexers 156, 158, 160, and 162. At this point it should be kept in mind that the circuitry of FIG. 5 serves on each clock pulse $\phi_n$ to calculate the four $a_k$'s of equation 7. Each of the multiplexers is in one of the calculating paths. Depending on the values (i.e., binary "1" or "0") of the two bits in the data byte being examined, the output from read only memories 148 and 150 is either passed by its associated multiplexer or is not passed (indicating that both bit positions have a binary value of "0") or is multiplied by a factor of two (indicating that both bit positions have a binary value of "1"). This may be better understood with reference to equation 7 and particularly in the calculation for the values $S_e$ and $S_o$. Thus in each equation the term $$(g_n + g_{(\frac{N}{2} - n)})$$

is calculated. This factor can have one of three different values either 0, 1, or 2. The value of this factor is then multiplied by cos $$[\frac{2\pi}{N} nk].$$

The cosine function is provided to multiplexer 156 and 158 from read only memories 148 and 150 respectively. The multiplying factor of 0, 1 or 2 is supplied as a second input to the multiplexers 156 and 158 from logic circuits 164 and 166 respectively.

The inputs to circuit 164 are obtained from the outputs of the circulating shift registers 116 and 118 whereas the inputs to logic circuit 166 are obtained from the recirculating registers 120 and 122. Logic circuits 164 and 166 may take the form of read only memories and serve as look-up tables to provide a binary "1" signal on either a multiply by one output circuit X1 or on a multiply by two output circuit X2 or to provide a binary "0" signals on both output circuits. In the later case, the binary word from the read only memory 148 is not passed by the multiplexers 156 and 158. FIG. 6 is a truth table which is applicable to both logic circuits 164 and 166. This truth table shows the values of the binary signals which may be applied to the two inputs of each of these logic circuits and the binary output signals which are carried by the multiplied-by-one, X1, and multiply-by-two, X2, output circuits. If both of the output circuits of logic circuit 164 carry binary "0" level signals then multiplexer 156 will not pass the binary word provided by the read only memory 148. If the multiply by one output circuit carries a binary "1" signal then the binary word provided by the read only memory 148 will be passed without change. If, on the other hand, the multiply-by-two output circuit carries a binary "1" signal then the multiplexer 156 will effectively multiply the binary word from the read only memory 148 by a factor of two. This is accomplished by hard wired circuitry within the multiplexer. It is to be recalled that the output from the read only memory 148 is a multibit word and the value of the binary signals carried by the eight bit lines involved may be multiplied by a factor of two by merely shifting the bit lines by one location as they are applied to a suitable AND gate located in the multiplexer. Similarly, multiplexer 158 receives the output from the logic circuit 166 and serves to either prevent passage of the binary word produced by the read only memory 150 or to multiply it by a factor of 1 or to multiply it by a factor of 2.

It is also seen from equation 7 that the derivation of the term "$D_e$" or "$D_0$" requires a determination of the value $$(g_n - g_{(\frac{N}{2} - n)}).$$

Since each data bit can have a value of only "1" or "0" the solution to this equation has a value of either +1, 0, or −1. The value of the solution is then multiplied by cosine $$(\frac{2\pi (nk)}{N}).$$

The cosine function is obtained from either the read only memory 152 or the read only memory 154 and applied respectively to multiplexers 160 and 162. The other multiplying factor is obtained from logic circuit 168 or 170. These logic circuits are similar to logic circuits 164 and 166 in that each may take the form of a read only memory. Logic circuit 168 receives its inputs from the outputs of shift registers 116 and 118 whereas logic circuit 170 receives its inputs from shift registers 120 and 122. Each of the logic circuits 168 and 170 has an output circuit which indicates that the output from the read only memory is multiplied by a factor of −1 and a second output circuit which indicates that the output from the read only memory should be multiplied by a factor of +1. To be multiplied by −1 the output circuit is effective only when it carries a binary "1" signal. Similarly the multiply by +1 output circuit is effective only when it carries a binary "1" signal. Thus the multiplying factor can be either a multiply by −1, multiply by +1, or multiply by 0. These commands are applied to multiplexers 160 and 162 from logic circuits 168, 170 respectively in accordance with the truth table illustrated in FIG. 7. The multiplexers 160 and 162 are made up of conventional logic circuits such as an AND gate for passing (multiply by +1) a multibit pattern from the read only memory. Also each of the multiplexers 160 and 162 includes hardwire circuitry to effect the multiplication of a binary word from its associated read only memory 152 or 154 by a factor of (−1). This may be accomplished with gating circuitry which when enabled upon command of the −1 signal line to the multiplexers enables gating circuitry which effectively passes the two's compliment of the binary word obtained from the associated read only memory.

The outputs from multiplexers 156, 158, 160 and 162 are respectively applied to summation circuits 172, 174, 176 and 178. Each of these summation circuits may take the form of a conventional adder-accumulator and each is clocked, as by the clock pulses $\phi_n$ from the clock source 130, so that upon each iteration the binary word stored in the summation circuit is added to the binary word being applied from the associated multiplexer. Summation circuits 174, 176 and 178 are not initialized but commence each cycle of operation (i.e., 32 iterations in the example being described) with an unloaded accumulator. This is simply indicated in each of these circuits by a connection to ground. However, the summation circuit 172 is initialized in that a constant factor of I is placed in the accumulator to which the adder-accumulating function builds upon during a cycle of operation (i.e., 32 iterations). The reason for initializing the summation circuit 172 can be more readily appreciated by examining equation 7. Here it will be noted that the $a_k$'s for $k$ equal 0, 2, 4, ...

$$(\frac{N}{4} - 2)$$

require either summation or the difference of $S_e$ and $S_0$ together with the addition of the factor $$(g)_{\frac{N}{4}} (-1)^{\frac{k}{2}}.$$

Consequently then, the circuit 172 provides an output of $S_e + I$, where $$I = (g)_{\frac{N}{4}} (-1)^{\frac{k}{2}}.$$

The variables in this equation relate to the value of a particular bit position with the even sample index ($k$) in effect. The value of the bit position can only be "1" or "0". Also, the result of the factor $(-1)^{k/2}$ can only result to values of −1 or +1. Hence, the value of I can only be −1, 0 or +1. The implementation of the foregoing is accomplished by the circuitry in FIG. 5 to be described below.

The even sample indices ($k_e$) are loaded into a multibit $k$ register 200. The purpose here is to determine whether $$\frac{(k_e)}{2}$$

is an odd number of an even number. It the value is an odd number and if the value of the bit position is a "1" then equation 9 requires that the initialization of summation circuit 172 be −1. Also if $$\frac{(k_e)}{2}$$

is an even number and the value of the bit position is a "1" then equation 8 requires that summation circuit 172 be initialized with a +1. Whether $$\frac{(k_e)}{2}$$

is an even number or an odd number can be determined by examining the value of the bit at the next least significant bit position of the binary word in register 200. If the bit at this bit position is a binary "1" signal then this is indicative that $$\frac{(k_e)}{2}$$

is an odd number. If the value of this bit position is a binary "0" then this means $$\frac{(k_e)}{2}$$

is an even number.

For purposes of clarification, this bit line is identified as $k_b$ and the signal carried thereon is applied to one input of a logic circuit 202. A second input to this logic circuit is taken from bit position (N/4) of register 114 to provide the value $$g(\frac{N}{4}).$$

Logic circuit 204 may take the form of a read only memory and serves as a look up table in accordance with the truth table illustrated in FIG. 8. If the value of the bit position is a binary "1" and a binary "0" signal is carried on bit line $k_b$, then the multiply by +1 output of the read only memory 202 carries a binary "1" signal, otherwise it carries a binary "0" signal. Also, if the value of the bit position (N/4) of register 114 is a binary "1" and bit line $k_b$ carries a binary "1" signal, then the multiply by −1 output of logic circuit 202 will carry a binary "1" signal, otherwise it carries a binary "0". The two output circuits of the read only memory 202 therefore provide command signals to a multiplexer 204. The multiplexer 204 is connected to two signal sources, one providing a multibit signal representative of −1 and the other providing a multibit signal representative of +1. If the +1 output of the read only memory 202 carries a binary "1" signal, then the multiplexer 204 passes the +1 signal as the initializing signal I to the summation circuit 172. If the multiply by −1 output circuit of read only memory 202 carries a binary "1" signal, then the multiplexer 204 passes a −1 signal as the initializing signal I to the summation circuit 172. If both the −1 and the +1 output circuits of read only memory 202 carry binary "0" signals, then multiplexer 202 passes no signal and, hence, the value of the initalization I is 0.

The four $a_k$ samples calculated in accordance with equation 7 require additional summation or subtraction of combinations of the outputs provided by summation circuits 172, 174, 176 and 178. The outputs from summation circuits 172 and 174 are summed in a summation circuit 206. The output from summation circuit 206 then provides the sample $a_k$ for k=0, 2, 4, . . .

$$(\frac{N}{4} - 2).$$

The output of the summation circuit 174 is subtracted from the output of the summation circuit 172 by means of a subtractor circuit 208. Consequently, the output from the subtractor circuit 208 provides the sample a $$(\frac{N}{2} - k)$$

for k = 0, 2, 4, . . .

$$(\frac{N}{4} - 2).$$

The outputs from summation circuits 176 and 178 are summed by a summation circuit 210 so that the output circuit thereof provides the $a_k$ samples for k=1, 2, 3, . . .

$$(\frac{N}{4} - 1).$$

The output of the summation circuit 178 is subtracted from the output of the summation circuit 176 by means of a subtractor circuit 212 so that the output circuit thereof provides that a $$(\frac{N}{2} - k)$$

samples of k=1, 2, 3, . . .

$$(\frac{N}{4} - 1).$$

The $129^{th}$ coefficient, $a_{(N/4)}$, is calculated by means of the circuit shown separately in FIG. 5d. This circuit serves to implement equation 7. Logic circuit 164, described above, provides signals which determine the sum of bits $g_n$ and $g_{(N/2)-n}$. These signals are applied to ROM 380 together with a signal from the n index generator 132. This signal from n index generator 132 determines the value of n/2 in the same fashion described with respect to the determination of the value of k/2. Based on these three signals, the ROM provides an output value of +2, +1, 0, −1, or −2. ROM 380 thus serves as a lookup table and is addressed by the three aforementioned signals. The output of ROM 380 is directed to summation circuit 382, which has been initialized to the value of $g_{n/4}(-1)^{n/8}$; for N = 256 this reduces simply to $g_{n/4}$. This value of $g_{n/4}$ is obtained from Q register 114. The output of summer 382, after a full cycle of n index generator 132, is the value of $a_{N/4}$. This value is redundantly calculated for each cycle of k index generator 134. If desired, additional logic circuitry can be added to inhibit this redundancy of calculation.

From the foregoing it can be seen that for each iteration of the sample index generator 134, four sample coefficients are provided by circuits 206, 208, 210 and 212 respectively. Once 32 operations have been completed, there will be a total of 128 coefficients or samples. This, in the example being given, will complete one cycle of operation where N is equal to 256. With each sample clock pulse $\phi_k$ four samples are provided and these samples are stored in a random access memory 300. This is achieved in the manner described below.

On each sample index clock pulse $\phi_k$ the binary signals stored in the sample summation circuits 206, 208, 210, 212, and 382 are respectively gated into associated sample registers 302, 304, 306, 308, and 388 by way of respectively associated AND gates 310, 312, 314, 316, and 384. These sample values will be maintained in the sample registers for the period between succeeding clock pulses $\phi_k$. During this holding period, the circuitry will calculate a second set of sample values for the next iteration of the sample index generator, i.e., $k_0$ = 3 and $k_e$ = 4. Consequently then, each of the sample registers contains a sample value in accordance with previous calculation for a sample index value. The address as to where a sample should be stored in the random access memory 300 may be obtained from the value of the sample bit index ($k$) in effect during the calculation of the sample stored in the respective registers. This may be achieved with the circuitry described below.

For each sample clock pulse $\phi_k$ the value of the odd sample index ($k_o$) is loaded into a parallel-in-parallel out shift register 320 and the previous value is gated out. Similarly, on each sample clock pulse $\phi_k$ the value of the even sample index ($k_e$) is loaded into a register 324 and the previous value is gated out. The previous value for the even sample index is loaded into an address register 326. This register is associated with the sample register 302 and now provides the information as to the address in memory 300 at which the sample in the sample register 302 is to be stored. The samples will be stored in memory 300 in a sequence of $k=0,1,2,3,\ldots$ $$\left(\frac{N}{2}\right)$$

The even sample index ($k_e$) from register 324 is also loaded into a count down counter 328. This counter is preset to a value of $$\left(\frac{N}{2}\right)$$

and, hence, on each iteration (for clock pulse $\phi_k$) it substracts the value of the even sample index ($k_e$) supplied to it from register 324. The difference is loaded into an address register 330. Address register 330 then contains the address at which the sample in the sample register 304 is to be written into memory 300.

The value of the odd sample index ($k_o$) outputted from register 320 with each clock pulse $\phi_k$ is loaded into a parallel in-parallel out address register 332. This register now contains the address at which the sample stored in register 306 is to be stored in memory 300. The odd sample index ($k_o$) outputted from register 320 is also loaded into a countdown counter 334 which is initially preset with a value of $$\left(\frac{N}{2}\right).$$

This counter will, for each smaple clock pulse $\phi_k$, subtract the last value of the sample index ($k_o$) from $$\left(\frac{N}{2}\right)$$

and load the result into a parallel-in-parallel out address register 336.

The address register 336 then contains the address at which the sample in the sample register 308 is to be stored in memory 300.

Address register 390 is hardwired to a value of N/4, which for N-256 will be a value of 64. Tis is the address at which sample $a_{N/4}$, contained in sample register 388, is to be stored in memory 300.

In the embodiment being described, only one sample can be written into memory 300 at a time. Consequently then, during the period between sample clock pulses $\phi_k$ each of the five samples stored in registers 302, 304, 306, 308, and 388 must be written into memory 300 at different points in time. This is achieved with the circuitry described below.

The sample index clock pulses $\phi_k$ are applied to the set input of a flip-flop 350. Each clock pulse causes this flip-flop to be actuated to its set condition so that its Q output carries a binary "1" signal. This binary "1" signal enables an AND gate 352 which then passes bit index clock pulse $\phi_n$ to a counter 354. Counter 354 merely counts five $\phi_n$ clock pulses and then repeats itself. As will be recalled, $\phi_n$ clock pulses occur at a rate of thirty-two times that of the $\phi_k$ clock pulses and during the period between succeeding $\phi_k$ clock pulses only five operations are required for writing the five samples into memory 300. As counter 354 provides its counting function it sequentially actuates gating circuits 356, 358, 360, 362, and 392 in that order. Gating circuits 356 through 392 may be considered part of an 8 by 2 multiplexing circuit 364. Each of these gating circuits may be considered as two AND gates which are both enabled at the same time with one passing the sample and the other passing the address from a pair of related sample and address registers.

Thus on the first count of counter 354, gating circuit 356 is enabled to pass the sample from register 302 and the address from 326. Also, at this time a $\phi_n$ clock pulse is passed by AND gate 352 to write input of memory 300. It follows then that the sample value located in register 302 is now written into the memory 300 at the address obtained from register 326. Similarly, on the second count of counter 354 the sample and address located in registers 304 and 330 are passed by gating circuit 358 so that the sample value in register 304 is written into the memory at a location in accordance with the address in register 330. On the third count of counter 354, gating circuit 360 is actuated to pass the sample and address located in registers 306 and 332 so that the sample value in register 306 is written into the memory 300 at the address located in register 332. Similarly, on count four, gating circuit 362 is enabled so that the sample value located in register 308 is written into memory 300 at the address obtained from register 336. On the fifth count, gating circuit 392 is enabled so that the sample value of $a_{N/4}$, located in register 388, is written into memory 300 at the address N/4 contained in register 390. Flip-flop 350 is reset on the trailing edge of the fifth clock pulse, thereby halting the writing process and preparing the circuit for the next set of samples. These operations continue for 32 iterations of the k index generator 134 in the example being discussed herein wherein N = 256. A counter 370 keeps track of these iterations in that it responds to the $\phi_k$ clock pulses and provides an output each time 32 clock pulses have been counted. This resets a flip-flop 372 so that its $\overline{Q}$ output now carries a binary "1" signal to enable an AND gate 374 which permits actuation of a new cycle of operation upon closure of switch 104.

A new cycle of operation commences upon closure of switch 104 so as to set flip-flop 106. The P register 102 is then loaded by the data source 100 and once loaded, the P counter 112 counts out and resets flip-flop 106 and also sets flip-flop 372. The Q output of flip-flop 372 now supplies a binary "1" signal to enable an AND gate 376 so as to pass the $\phi_n$ clock pulses.

The random access memory in the example being described stores 129 samples, with sample addresses from 0 to 128. Due to the symmetrical properties discussed hereinbefore, samples 1 through 127 are symmetrical with samples 129 through 256. Samples 0 and 128 are unique points of symmetry. Consequently then, for N=256 the samples are read out by sequentially addressing the read only memory from addresses 0 to 128 and then backwards from 127 to 0. Samples 128 and 0 are each read only once. This is achieved by addressing the random access memory as with an up-down counter 400. Upon closure of a switch 402 a read cycle is commenced in that a read command signal is applied to the random access memory 300 and a flip-flop 404 is set so that its Q output carries a binary "1" signal and its $\overline{Q}$ output carries a binary "0" signal. The binary "1" obtained from the Q output actuates the up input of the counter 400. The counter is then clocked by clock pulses $\phi_R$ obtained from a suitable clock source 406. The counter now counts in an upward direction to a count of (N/2). Each count provides a new address so that the random access memory is sequentially addressed from addresses 1 through 128. At this point the counter counts out and applies a reset signal to reset flip-flop 404. The $\overline{Q}$ output of flip-flop 404 now carries a binary "1" signal to actuate the down input of counter 400 so that the counter now counts the clock pulses $\phi_R$ in a downward direction until the counter counts out. Consequently, a total of N sample coefficients ($a_k$) are provided.

The read cycle commences upon closure of switch 402 and the reading operation is maintained because closure of this switch sets a flip flop 410 which provides a read command to the read input of memory 300. N counter 412 counts the clock pulses $\phi_R$ and upon a count of N serves to reset flip flop 410 so as to remove the read signal. The circuitry of FIG. 5 is now in condition to provide the Fourier transform of a second byte of data to be fed from data source 100 to the register 102.

Although the invention has been described in conjunction with preferred embodiments, it is apparent that other modifications and arrangements for parts may be made without departing from the spirit and scope of the present invention as defined by the appended claims.

What is claimed is:

1. Apparatus for generating a Fourier transform of a finite block of bilevel data bits comprising:

a plurality of gated sinusoidal signal generator means each corresponding to respective said data bits of said finite block for selectively providing or not providing a corresponding sinusoidal signal to a summing means depending upon the level of said data bits; and, summing means for additively combining the signals selectively provided by said gated signal generator means to provide a sum signal substantially corresponding to said transform.

2. Apparatus for generating a cosine transform of a finite block of bilevel data bits comprising:

a plurality of gated cosine generators each corresponding to a respective one of said data bits of said finite block for selectively providing or not providing a corresponding cosine signal to a summing means depending upon the level of the corresponding said data bit; and, summing means for additively combining the cosine signals selectively provided by said gated cosine generators to provide a sum signal substantially corresponding to said cosine transform.

3. Apparatus as set forth in claim 2 wherein said corresponding cosine signals selectively provided by each of said plurality of gated cosine generator means have relative frequencies corresponding to the relative positions within said finite block of the corresponding ones of said data bits of said finite block of bilevel data bits.

4. Apparatus as set forth in claim 2 wherein each of said plurality of gated cosine generator means comprises means for continuously providing said corresponding cosine signal and gating means responsive to said corresponding one of said data bits for selectively providing or not providing said signal to said summing means depending upon the level of said data bit.

5. Apparatus as set forth in claim 4 wherein said corresponding cosine signals each comprise periodic sequences of multibit digital signals, and each of said means for continuously providing said corresponding cosine signals comprises digital sequence generator means for generating said periodic sequence of multibit digital signals having values in accordance with selected phases of a corresponding sinusoidal function.

6. Apparatus as set forth in claim 5 wherein each of said digital sequence generator means includes addressable memory means containing said multibit digital signals at addressable locations therein, and wherein said apparatus further comprises addressing means for periodically addressing said addressable locations in each of said memory means so as to thereby provide said periodic sequence of multibit digital signals.

7. Apparatus as set forth in claim 6 wherein said addressing means includes means for providing a single address signal and means for directing said signal to each of said memory means whereby said signal serves to address all of said memory means simultaneously.

8. Apparatus as set forth in claim 7 wherein said multibit digital signals are arranged at numerically sequential addresses within each of said memory means, and wherein said addressing means comprises digital counter means for addressing each of said memory means in numerical sequence.

9. Apparatus for generating a plurality of discrete coefficients which together comprise a cosine transform of a finite block of bilevel data bits, comprising:

output index means for providing even digital multibit signals $k_e$ and odd digital multibit signals $k_o$;

first means responsive to said even signals $k_e$ and to the data bits of said finite block of bilevel data bits for providing first and second partial sum signals substantially in accordance with the mathematical expressions:

$$S_e = \sum_{\substack{n=0 \\ n=\text{even}}}^{\frac{N}{4}-2} (g_n + g_{\frac{N}{2}-n}) \cos\left\{2\pi n\left(\frac{k_e}{N}\right)\right\}$$

$$S_o = \sum_{\substack{n=1 \\ n=\text{odd}}}^{\frac{N}{4}-1} (g_n + g_{\frac{N}{2}-n}) \cos\left\{2\pi n\left(\frac{k_e}{N}\right)\right\}$$

and also responsive to said odd signals $k_o$ for providing third and fourth partial sum signals substantially in accordance with the mathematical expressions:

$$D_e = \sum_{\substack{n=0 \\ n=\text{even}}}^{\frac{N}{4}-2} (g_n - g_{\frac{N}{2}-n}) \cos\left\{2\pi n\left(\frac{k_o}{N}\right)\right\}$$

$$D_o = \sum_{\substack{n=1 \\ n=\text{odd}}}^{\frac{N}{4}-1} (g_n - g_{\frac{N}{2}-n}) \cos\left\{2\pi n\left(\frac{k_o}{N}\right)\right\}$$

where:
$S_e$, $S_o$, $D_e$, and $D_o$ correspond respectively to the values of said first, second, third, and fourth partial sum signals for particular values of $k_e$ and $k_o$;
$k_e$ and $k_o$ respectively correspond to said even and odd signals;
N is the total number of coefficients generated in one full cycle of said coefficients;
n is the data bit index number; and,
$g_n$ is the one of said data bits located at the $n^{th}$ position in said block of data; and,
means for combining said first and second partial sum signals for each value of $k_e$ so as to simultaneously provide two sum signals corresponding to two of said coefficients and for combining said third and fourth partial sum signals for each value of $k_o$ so as to simultaneously provide another two sum signals corresponding to another two of said coefficients.

10. Apparatus as set forth in claim 9, further comprising second means for providing a fifth digital signal substantially in accordance with the mathematical expression:

$$I = g_{(N/4)} (-1)^{k_e/2}$$

and wherein said combining means includes means for combining said fifth digital signal (I) and said first sum signal ($S_1$) and for combining said fifth digital signal (I) and said second sum signal ($S_2$).

11. Apparatus as set forth in claim 9 wherein said output index means includes means for providing said even and odd digital multibit signals at substantially the same time, whereby four of said sum signals are provided at substantially the same time.

12. Apparatus as set forth in claim 9 wherein said first means comprises input index means for providing even digital multibit signals $n_e$ and odd digital multibit signals $n_o$;

product means responsive to $n_e$, $n_o$, $k_e$, and $k_o$ for providing four product signals $n_e k_e$, $n_e k_o$, $n_o k_e$, and $n_o k_o$;

cosine generator means responsive to said four product signals for providing four cosine signals having values in accordance with the expressions:

$$\cos\left\{\frac{2\pi}{N}(n_e k_e)\right\},$$

$$\cos\left\{\frac{2\pi}{N}(n_e k_o)\right\},$$

$$\cos\left\{\frac{2\pi}{N}(n_o k_e)\right\},$$

and cos $$\left\{\frac{2\pi}{N}(n_o k_o)\right\};$$

cosine signal gating means responsive to said cosine signals and to said finite block of bilevel data bits for gating said four cosine signals in accordance with the values of said bilevel data bits to provide four gated signals at the output thereof; and, summing means responsive to said four gated signals for accumulating the value of each of said four gated signals as said input index means provides different ones of said even and odd digital multibit signals $n_e$ and $n_o$.

13. Apparatus as set forth in claim 12 wherein said cosine generator means comprises four digital memory means each containing at addressable locations therein multibit digital signals corresponding to selected phases of a corresponding cosine signal, and wherein each of said digital memory means is addressed by a corresponding product signal to provide said cosine signals to said cosine signal gating means.

14. Apparatus as set forth in claim 9 wherein said combining means includes means for additively combining said first, second, third, and fourth, signals substantially in accordance with the mathematical expressions:

$$S_1 = a_{ke} = S_e + S_o$$

$$S_2 = a_{(p-k_e)} = S_e - S_o$$

$$S_3 = a_{ko} = D_e + D_o$$

$$S_4 = a_{(p-k_o)} = D_e - D_o$$

where
$S_1$, $S_2$, $S_3$, and $S_4$ correspond to said four sum signals,
$a_{ke}$ corresponds to the value of the $k_e^{th}$ said coefficient,
$a_{(p-k_e)}$ corresponds to the value of the $(p-k_e)^{th}$ said coefficient,
$a_{ko}$ corresponds to the value of the $k_o^{th}$ said coefficient, and $a_{(p-k_o)}$ corresponds to the value of the $(p-k_o)^{th}$ said coefficient.

15. Apparatus as set forth in claim 14 and further comprising means responsive to said sum signals for ordering said signals in accordance with the respective values of their corresponding said output index numbers.

16. Apparatus as set forth in claim 15 wherein said means responsive to said sum signals comprises first memory means responsive to said sum signals for providing corresponding memory signals at addressable locations therein and having a memory output responsive to addressed ones of said memory signals, and memory address means for sequentially addressing said first memory means such that said coefficients are sequentially displayed on said memory output.

17. Apparatus as set forth in claim 16 wherein said output index means nonrepetitively provides output index signals having values corresponding to each of the integers from O to N, inclusive, such that said first memory means contains stored signals representing one full cycle of said Fourier transform coefficients.

18. Apparatus as set forth in claim 16 wherein said address means repetitively addresses said first memory means so as to provide a plurality of cycles of said Fourier transform coefficients on said memory output.

19. Apparatus as set forth in claim 16 wherein said output index means nonrepetitively provides output index signals having values corresponding to each of the integers from O to N/2, inclusive, and wherein said address means sequentially addresses said first memory means to provide one half cycle of said Fourier transform coefficients on said memory output and then addresses said first memory means in reverse sequence to provide the remaining half cycle of said Fourier transform coefficients on said memory output.

20. Apparatus for recording a finite block of bilevel data bits in the form of a Fourier transform hologram comprising:

means for generating a Fourier transform of said finite block of bilevel data bits, including a plurality of gated sinusoidal signal providing means, each corresponding to respective said data bits of said finite block for selectively providing or not providing a corresponding sinusoidal signal to a summing means depending upon the level of said data bits, and summing means for additively combining the signals selectively provided by said gated signal providing means to thereby provide a sum signal substantially corresponding to said Fourier transform; and, hologram recording means responsive to said sum signal for recording a Fourier transform hologram in accordance therewith.

21. Apparatus as set forth in claim 20, wherein said hologram recording means comprises:

coherent light source means for providing a beam of coherent light;

means for modulating the intensity of said beam of light in accordance with said sum signal; and, means for recording said intensity modulated variations of said beam of light whereby said recorded variations comprise a Fourier transform hologram.

22. Apparatus as set forth in claim 20 wherein the first several data bits of said finite block of bilevel data bits are digital zeros.

23. Apparatus as set forth in claim 20 wherein said transform means provides a number of output coefficients N such that $N = 2p$.

* * * * *